(12) United States Patent
Li et al.

(10) Patent No.: US 12,524,172 B2
(45) Date of Patent: Jan. 13, 2026

(54) DATA PROCESSING METHOD AND STORAGE SYSTEM

(71) Applicant: HUAWEI TECHNOLOGIES CO., LTD., Guangdong (CN)

(72) Inventors: Zheng Li, Xi'an (CN); Zhenbo Zhang, Xi'an (CN); Yuan Gao, Xi'an (CN)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

(21) Appl. No.: 18/617,005

(22) Filed: Mar. 26, 2024

(65) Prior Publication Data

US 2024/0231657 A1 Jul. 11, 2024

Related U.S. Application Data

(63) Continuation of application No. PCT/CN2022/097161, filed on Jun. 6, 2022.

(30) Foreign Application Priority Data

Sep. 28, 2021 (CN) .......................... 202111146106.9

(51) Int. Cl.
*G06F 3/06* (2006.01)

(52) U.S. Cl.
CPC .......... *G06F 3/0638* (2013.01); *G06F 3/0604* (2013.01); *G06F 3/0676* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20;

(Continued)

(56) References Cited

U.S. PATENT DOCUMENTS 5,634,028 A * 5/1997 Brady .................... G06F 3/0601
711/202

FOREIGN PATENT DOCUMENTS

| CN | 103473150 A | * 12/2013 |
| CN | 106066818 A | 11/2016 |
| CN | 109271353 A | * 1/2019 |

OTHER PUBLICATIONS

Machine translation of CN106066818A (Year: 2016).*
Secure Hash Standard (SHS); National Institute of Standards and Technology; Aug. 2015; retrieved from https://nvlpubs.nist.gov/nistpubs/FIPS/NIST.FIPS.180-4.pdf (Year: 2015).*
Machine translation of CN-103473150-A; retrieved from https://worldwide.espacenet.com/patent/search/family/049798016/publication/CN103473150A?q=CN%20103473150 (Year: 2013).*
Machine translation of CN-109271353-A; retrieved from https://worldwide.espacenet.com/patent/search/family/065188509/publication/CN109271353A?q=CN%20109271353 (Year: 2019).*

(Continued)

*Primary Examiner* — Daniel C. Chappell
(74) *Attorney, Agent, or Firm* — Fish & Richardson P.C.

(57) ABSTRACT

Embodiments of this application provide example data processing methods and example storage systems. One example method is performed by the storage system, and includes obtaining physical addresses of a plurality of pieces of first data stored in a hard disk, where each piece of first data is the same as at least one piece of second data in a plurality of pieces of second data written later or to be written. To-be-rewritten target first data in the plurality of pieces of first data is determined based on distribution of the physical addresses of the plurality of pieces of first data.

20 Claims, 8 Drawing Sheets

(58) Field of Classification Search
CPC ........ G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

OTHER PUBLICATIONS

S. Luo and M. Hou, "A novel chunk coalescing algorithm for data deduplication in cloud storage," 2013 IEEE Jordan Conference on Applied Electrical Engineering and Computing Technologies (AEECT), Amman, Jordan, 2013, pp. 1-5, doi: 10.1109/AEECT.2013.6716447. (Year: 2013).*

H. Wu, C. Wang, K. Lu, Y. Fu and L. Zhu, "One Size Does Not Fit All: The Case for Chunking Configuration in Backup Deduplication," 2018 18th IEEE/ACM International Symposium on Cluster, Cloud and Grid Computing (CCGRID), Washington, DC, USA, 2018, pp. 213-222, doi: 10.1109/CCGRID.2018.00036. (Year: 2018).*

International Search Report and Written Opinion in International Appln. No. PCT/CN2022/097161, mailed on Sep. 7, 2022, 15 pages (with English translation).

* cited by examiner

DATA PROCESSING METHOD AND STORAGE SYSTEM

CROSS-REFERENCE TO RELATED APPLICATIONS

This application is a continuation of International Application PCT/CN2022/097161, filed on Jun. 6, 2022, which claims priority to Chinese Patent Application No. 202111146106.9, filed on Sep. 28, 2021. The disclosures of the aforementioned applications are hereby incorporated by reference in their entireties.

TECHNICAL FIELD

This application relates to the field of storage technologies, and specifically, to a data processing method and a storage system.

BACKGROUND

In a storage system, duplicate data deletion (which is referred as deduplication for short) is usually used to reduce time required for storing data and save storage space. In a scenario in which the storage system is used as secondary storage system, a host successively stores different versions of a same document in the storage system. In this case, deduplication is performed on data that is in a new version and that is the same as data in an old version, and the data in the old version is referred to. As a result, a read speed of the new version is lower than that of the old version.

SUMMARY

Embodiments of this application are intended to provide a data processing solution, to determine, based on distribution of data that is stored in a hard disk and that is referred to or to be referred to, data that needs to be rewritten, so as to improve data read performance.

To achieve the foregoing objective, a first aspect of this application provides a data processing method. The method is performed by a storage system, and includes: obtaining physical addresses of a plurality of pieces of first data stored in a hard disk, where each piece of first data is the same as at least one piece of second data in a plurality of pieces of second data written later or to be written; and determining, based on distribution of the physical addresses of the plurality of pieces of first data, to-be-rewritten target first data in the plurality of pieces of first data.

The to-be-rewritten target first data in the plurality of pieces of first data is determined based on the distribution of the physical addresses of the plurality of pieces of first data, so that the to-be-rewritten first data can be dynamically determined in real time based on distribution of the plurality of pieces of first data. Therefore, optimal data read performance is achieved when an amount of rewritten data is as small as possible.

In a possible implementation of the first aspect, the plurality of pieces of second data are data written in a latest preset time period, and the plurality of pieces of second data refer to the plurality of pieces of first data.

In the method of the first aspect, the data that needs to be rewritten is determined for the first data referred to by the second data written within the latest preset time period, so that the method is also applicable to a source deduplication scenario.

In a possible implementation of the first aspect, the determining, based on distribution of the physical addresses of the plurality of pieces of first data, to-be-rewritten target first data in the plurality of pieces of first data includes: assigning, based on the physical addresses of the plurality of pieces of first data, the plurality of pieces of first data into a plurality of address ranges, where a length of each address range is less than or equal to a first preset length; and determining, based on an amount of first data included in each address range, a quantity of target address ranges in the plurality of address ranges, where first data in the target address range is the target first data.

In a possible implementation of the first aspect, the assigning, based on the physical addresses of the plurality of pieces of first data, the plurality of pieces of first data into a plurality of address ranges includes: sorting the plurality of physical addresses based on sizes of the physical addresses of the plurality of pieces of first data; and assigning at least one consecutively sorted first physical address in the plurality of first physical addresses into one target address range, where a difference between a largest address and a smallest address in the at least one first physical address is less than or equal to the first preset length.

In a possible implementation of the first aspect, the determining, based on an amount of first data included in each address range, a quantity of target address ranges in the plurality of address ranges includes: sorting the plurality of address ranges in descending order of the amount of first data included in each address range; and determining, based on a sorting position of each address range and the amount of first data included in each address range, the quantity of target address ranges in the plurality of address ranges.

In a possible implementation of the first aspect, the determining, based on a sorting position of each address range and the amount of first data included in each address range, the quantity of target address ranges in the plurality of address ranges includes: determining a first sequence number based on a sorting sequence number of the sorting position of each address range, the amount of first data included in each address range, a total amount of to-be-written data, a target write bandwidth, a first write bandwidth, and a second write bandwidth, where the first sequence number indicates a largest quantity of target address ranges; and determining, based on the first sequence number, the quantity of target address ranges, where the first write bandwidth is a write bandwidth corresponding to performing deduplication on all the second data, and the second write bandwidth is a write bandwidth corresponding to storing all the second data in the hard disk.

The quantity of target address ranges is determined based on the first sequence number, so that write performance of the plurality of pieces of second data reaches the target write bandwidth, or a rewriting amount of the target first data is less than or equal to a target rewriting amount.

In a possible implementation of the first aspect, the determining, based on a sorting position of each address range and the amount of first data included in each address range, the quantity of target address ranges in the plurality of address ranges includes: determining a second sequence number based on the sorting sequence number of the sorting position of each address range, the amount of first data included in each address range, a data amount of target data, a target read bandwidth, and an amount of data that is first written and that is in the target data, where the second sequence number indicates a smallest quantity of target address ranges; and determining, based on the second sequence number, the quantity of target address ranges.

The quantity of target address ranges is determined based on the second sequence number, so that read performance of the plurality of pieces of second data reaches the target read bandwidth.

In a possible implementation of the first aspect, the determining, based on a sorting position of each address range and the amount of first data included in each address range, the quantity of target address ranges in the plurality of address ranges includes: determining, based on the sorting sequence number of the sorting position of each address range and the amount of first data included in each address range, an optimal sequence number between the first sequence number and the second sequence number; and determining, based on the optimal sequence number, the quantity of target address ranges in the plurality of address ranges.

The quantity of target address ranges is determined based on the optimal sequence number, so that optimal read performance is achieved when an amount of rewritten data is as small as possible.

In a possible implementation of the first aspect, the method further includes: storing, in the hard disk, target second data that is the same as the target first data; deleting the target first data from the hard disk; and recording a reference of the target first data to the target second data.

In a possible implementation of the first aspect, the method further includes: receiving a read request, where the read request is for reading a plurality of pieces of third data written into the hard disk within the latest preset time period, and the plurality of pieces of third data include the plurality of pieces of second data; obtaining physical addresses of the plurality of pieces of third data; and determining, based on distribution of the physical addresses of the plurality of pieces of third data, a quantity of times of reading the plurality of pieces of third data.

Whether to perform aggregated reading on several pieces of discrete third data for one time is dynamically determined based on the distribution of the physical addresses of the plurality of pieces of third data, so that time of reading the hard disk is reduced and read performance is improved.

In a possible implementation of the first aspect, the determining, based on distribution of the physical addresses of the plurality of pieces of third data, a quantity of times of reading the plurality of pieces of third data includes: assigning, based on the physical addresses of the plurality of pieces of third data, the plurality of pieces of third data into a plurality of address ranges, where a length of each address range is less than or equal to a second preset length; and determining to read n first address ranges in the plurality of address ranges for one time, where a difference between a largest address and a smallest address in the n first address ranges is less than or equal to n times of the second preset length.

A second aspect of this application provides a storage system, where the storage system includes: an obtaining unit, configured to obtain physical addresses of a plurality of pieces of first data stored in a hard disk, where each piece of first data is the same as at least one piece of second data in a plurality of pieces of second data written later or to be written; and a determining unit, configured to determine, based on distribution of the physical addresses of the plurality of pieces of first data, to-be-rewritten target first data in the plurality of first data.

In a possible implementation of the second aspect, the plurality of pieces of second data are data written in a latest preset time period, and the plurality of pieces of second data refer to the plurality of pieces of first data.

In a possible implementation of the second aspect, the determining unit is specifically configured to: assign, based on the physical addresses of the plurality of pieces of first data, the plurality of pieces of first data into a plurality of address ranges, where a length of each address range is less than or equal to a first preset length; and determine, based on an amount of first data included in each address range, a quantity of target address ranges in the plurality of address ranges, where first data in the target address range is the target first data.

In a possible implementation of the second aspect, the determining unit is specifically configured to: sort the plurality of physical addresses based on sizes of the physical addresses of the plurality of pieces of first data; and assign at least one consecutively sorted first physical address in the plurality of physical addresses into one target address range, where a difference between a largest address and a smallest address in the at least one first physical address is less than or equal to the first preset length.

In a possible implementation of the second aspect, the determining unit is specifically configured to: sort the plurality of address ranges in descending order of amount of first data included in each address range; and determine, based on a sorting position of each address range and the amount of first data included in each address range, the quantity of target address ranges in the plurality of address ranges.

In a possible implementation of the second aspect, the determining unit is specifically configured to: determine a first sequence number based on a sorting sequence number of the sorting position of each address range, the amount of first data included in each address range, a total amount of to-be-written data, a target write bandwidth, a first write bandwidth, and a second write bandwidth, where the first sequence number indicates a largest quantity of target address ranges; and determine, based on the first sequence number, the quantity of target address ranges, where the first write bandwidth is a write bandwidth corresponding to performing deduplication on all the second data, and the second write bandwidth is a write bandwidth corresponding to storing all the second data in the hard disk.

In a possible implementation of the second aspect, the determining unit is specifically configured to: determine a second sequence number based on the sorting sequence number of the sorting position of each address range, the amount of first data included in each address range, a data amount of target data, a target read bandwidth, and an amount of data that is first written and that is in the target data, where the second sequence number indicates a smallest quantity of target address ranges; and determine, based on the second sequence number, the quantity of target address ranges.

In a possible implementation of the second aspect, the determining unit is specifically configured to: determine, based on the sorting sequence number of the sorting position of each address range and the amount of first data included in each address range, an optimal sequence number between the first sequence number and the second sequence number; and determine, based on the optimal sequence number, the quantity of target address ranges in the plurality of address ranges.

In a possible implementation of the second aspect, the storage system further includes: a storage unit, configured to store, in the hard disk, target second data that is the same as the target first data; a deletion unit, configured to delete the target first data from the hard disk; and a recording unit, configured to record a reference of the target first data to the target second data.

In a possible implementation of the second aspect, the storage system further includes: a receiving unit, configured to receive a read request, where the read request is for reading a plurality of pieces of third data written into the hard disk within the latest preset time period, and the plurality of pieces of third data include the plurality of pieces of second data. The obtaining unit is further configured to obtain physical addresses of the plurality of pieces of third data. The determining unit is further configured to determine, based on distribution of the physical addresses of the plurality of pieces of third data, a quantity of times of reading the plurality of pieces of third data.

In a possible implementation of the second aspect, the determining unit is specifically configured to: assign, based on the physical addresses of the plurality of pieces of third data, the plurality of pieces of third data into a plurality of address ranges, where a length of each address range is less than or equal to a second preset length; and determine to read n first address ranges in the plurality of address ranges for one time, where a difference between a largest address and a smallest address in the n first address ranges is less than or equal to n times of the second preset length.

A third aspect of this application provides a storage system, including a processor and a memory. The memory stores executable computer program instructions, and the processor executes the executable computer program instructions to implement the method in the first aspect and the possible implementations of the first aspect.

A fourth aspect of this application provides a computer-readable storage medium. The computer-readable storage medium stores computer program instructions, and when the computer program instructions are executed on a computer or a processor, the computer or the processor is enabled to perform the method in the first aspect and the possible implementations of the first aspect.

A fifth aspect of this application provides a computer program product, including computer program instructions. When the computer program instructions are run on a computer or a processor, the computer or the processor is enabled to perform the method in the first aspect and the possible implementations of the first aspect.

BRIEF DESCRIPTION OF DRAWINGS

Embodiments of this application are described with reference to accompanying drawings, so that embodiments of this application can be clearer.

DESCRIPTION OF EMBODIMENTS

The following describes technical solutions of embodiments in this application with reference to accompanying drawings.

A data processing solution in an embodiment of this application may be performed by a storage system, to improve read/write performance of the storage system. To facilitate understanding of the solution in this embodiment of this application, the storage system is first described. The storage system includes a centralized storage system and a distributed storage system. The centralized storage system means that one or more primary devices form a central node, data is centrally stored in the central node, and all data processing services of the entire system are centrally deployed on the central node. The distributed storage system refers to a system in which data is stored on a plurality of independent storage nodes in a distributed manner. A user can store/obtain data from the storage nodes by using applications. A computer running these applications is referred to as an "application server". The application server may be a physical machine or a virtual machine. A physical application server includes, but is not limited to a desktop computer, a server, a laptop computer, and a mobile device. The application server can access the storage nodes by using a switch, to store/obtain data.

Figure 1A:
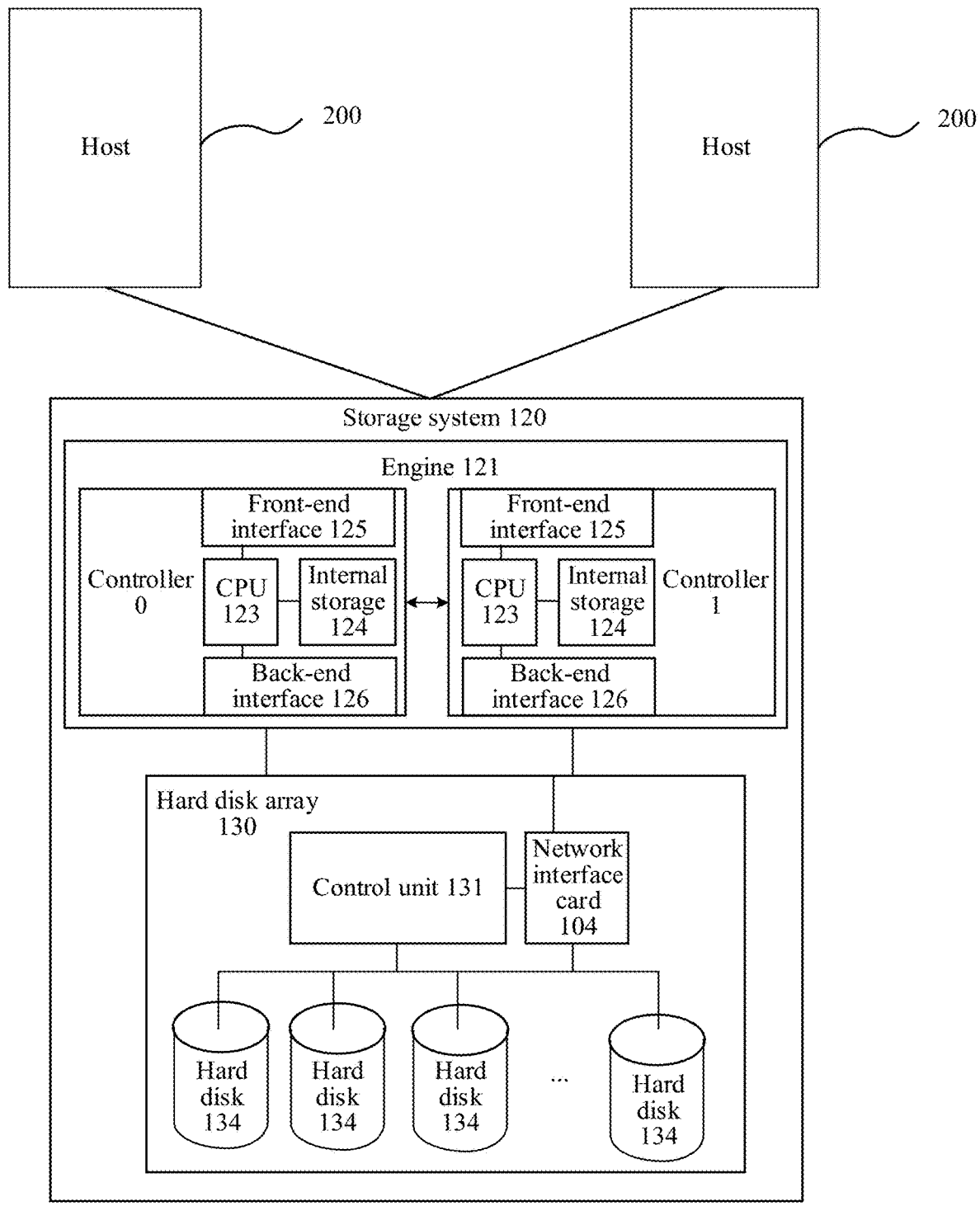
FIG. 1A is an architectural diagram of a centralized storage system 120 of a disk and controller separated structure to which an embodiment of this application is applied.

FIG. 1A is an architectural diagram of a centralized storage system 120 of a disk and controller separated structure to which an embodiment of this application is applied. The storage system 120 is connected to a plurality of hosts 200 (two hosts 200 are shown in FIG. 1A). For example, the plurality of hosts 200 are application servers.

A feature of the centralized storage system shown in FIG. 1A is that the centralized storage system has a unified entry port, and all data from the host 200 needs to pass through the entry port. For example, the entry port is an engine 121 in the storage system 120.

As shown in FIG. 1A, there are one or more controllers in the engine 121. In FIG. 1A, an example in which the engine includes two controllers is used for description. There is a mirror channel between a controller 0 and a controller 1. In this case, after the controller 0 writes data into a memory 124 of the controller 0, a copy of the data may be sent to the controller 1 through the mirror channel, and the controller 1 stores the copy in a local memory 124 of the controller 1. In this way, the controller 0 and the controller 1 back up each other. When the controller 0 is faulty, the controller 1 may take over a service of the controller 0. When the controller 1 is faulty, the controller 0 may take over a service of the controller 1. Therefore, unavailability of the entire storage system 120 caused by a hardware fault is avoided. When four controllers are deployed in the engine 121, a mirror channel exists between any two controllers. Therefore, the any two controllers back up each other.

The engine 121 further includes a front-end interface 125 and a back-end interface 126. The front-end interface 125 is configured to communicate with an application server, to provide a storage service for the application server. The back-end interface 126 is configured to communicate with a hard disk 134, to expand a capacity of the storage system. The engine 121 may connect to more hard disks 134 by using the back-end interface 126, to form a very large storage resource pool.

In terms of hardware, as shown in FIG. 1A, the controller 0 includes at least a processor 123 and the memory 124. The processor 123 is a central processing unit (CPU), configured to process a data access request from outside the storage system (a server or another storage system), and also configured to process a request generated inside the storage system. For example, when receiving, through the front-end port, a data write request sent by the server, the processor 123 temporarily stores, in the memory 124, data in the data write request. When a total amount of data in the memory 124 reaches a specific threshold, the processor 123 sends, through the back-end port 126, the data stored in the memory 124 to the hard disk 134 for persistent storage.

The memory 124 refers to an internal memory that directly exchanges data with the processor 123. The memory 124 can read and write data at any time at a high speed, and serves as a temporary data memory for an operating system or another running program. The memory 124 includes at least two types of memories. For example, the memory may be a random access memory or a read-only memory (ROM). For example, the random access memory is a dynamic random access memory (DRAM) or a storage class memory (SCM).

Hardware components and a software structure of the controller 1 (and another controller that is not shown in FIG. 1A) are similar to those of the controller 0, and details are not described herein again.

In the storage system in which a disk and a controller are separated shown in FIG. 1A, the engine 121 may not have a disk slot, the hard disk 134 needs to be disposed in a disk enclosure 130, and the back-end interface 126 communicates with the disk enclosure 130. The back-end interface 126 exists in the engine 121 in a form of an adapter card, and one engine 121 may connect to a plurality of disk arrays by using two or more than two back-end interfaces 126. Alternatively, the adapter card may be integrated in a main board. In this case, the adapter card may communicate with the processor 123 by using a PCIE bus.

It should be noted that only one engine 121 is shown in FIG. 1A. However, during actual application, the storage system may include two or more than two engines 121, and redundancy or load balancing is performed among the plurality of engines 121.

The disk enclosure 130 includes a control unit 131 and several hard disks 134. The control unit 131 may have a plurality of forms. In one case, the disk enclosure 130 belongs to an intelligent disk enclosure. As shown in FIG. 1A, the control unit 131 includes a CPU and a memory. The CPU is configured to perform operations such as address translation and data reading and writing. The memory is configured to temporarily store data to be written into the hard disk 134, or data that is to be sent to the controller and that is read from the hard disk 134. In another case, the control unit 131 is a programmable electronic component, such as a data processing unit (DPU). The DPU has versatility and programmability of the CPU, but is more specialized, and can run efficiently on a network data packet, a storage request, or an analysis request. The DPU is distinguished from the CPU by a high degree of parallelism (which requires processing a large quantity of requests). Optionally, the DPU herein may alternatively be replaced with a processing chip such as a graphics processing unit (GPU) or embedded neural-network processing units (NPU). Usually, there may be one control unit 131, or there may be two or more than two control units 131. When the disk enclosure 130 includes at least two control units 131, there is a homing relationship between the hard disk 134 and the control unit 131, and each control unit can access only a hard disk belonging to the control unit. As a result, forwarding a data read/write request between the control units 131 is usually involved, resulting in a long data access path. In addition, if storage space is insufficient, when a new hard disk 134 is added to the disk enclosure 130, a homing relationship between the hard disk 134 and the control unit 131 needs to be re-bound. As a result, an operation is complex, and expansibility of the storage space is poor. Therefore, in another implementation, a function of the control unit 131 may be offloaded to a network interface card 104. In other words, in this implementation, the disk enclosure 130 does not have the control unit 131 inside, but the network interface card 104 completes data reading and writing, address translation, and other computing functions. In this case, the network interface card 104 is an intelligent network interface card. The intelligent network interface card may include a CPU and a memory. The CPU is configured to perform operations such as address translation and data reading and writing. The memory is configured to temporarily store data to be written into the hard disk 134, or data that is to be sent to the controller and that is read from the hard disk 134. The network interface card 104 may alternatively be a programmable electronic component, for example, a data processing unit (data processing unit, DPU). The DPU has versatility and programmability of the CPU, but is more specialized, and can run efficiently on a network data packet, a storage request, or an analysis request. The DPU is distinguished from the CPU by a high degree of parallelism (which requires processing a large quantity of requests). Optionally, the DPU herein may alternatively be replaced with a processing chip such as a graphics processing unit (GPU) or embedded neural-network processing units (NPU). There is no homing relationship between the network interface card 104 and the hard disk 134 in the disk enclosure 130, and the network interface card 104 may access any hard disk 134 in the disk enclosure 130. Therefore, when storage space is insufficient, it is convenient to expand the hard disk.

For example, the hard disk 134 is a hard disk drive (HDD). The HDD has low cost and a large capacity, and is a mainstream persistent storage medium currently. Due to limitation of a mechanical component in the HDD, read performance of the HDD is closely related to an arrangement manner of data stored in the HDD. When the data stored in the HDD is scattered, in other words, continuity of data storage addresses is poor, data read performance (for example, a read speed) is poor, and vice versa.

It may be understood that, although FIG. 1A shows the centralized storage system of the disk and controller separated structure, the centralized storage system is not intended to limit an application scope of this embodiment of this application. For example, this embodiment of this application may alternatively be applied to a centralized storage system 220 of a disk and controller integrated structure shown in FIG. 1B. In the centralized storage system 220 of the disk and controller integrated structure, different from the disk and controller separated structure, the engine 121 has the disk slot, the hard disk 134 may be directly deployed in the engine 121, and the back-end interface 126 is an optional configuration. When storage space of the system is insufficient, more hard disks or hard disk arrays may be connected by using the back-end interface 126.

Figure 1B:
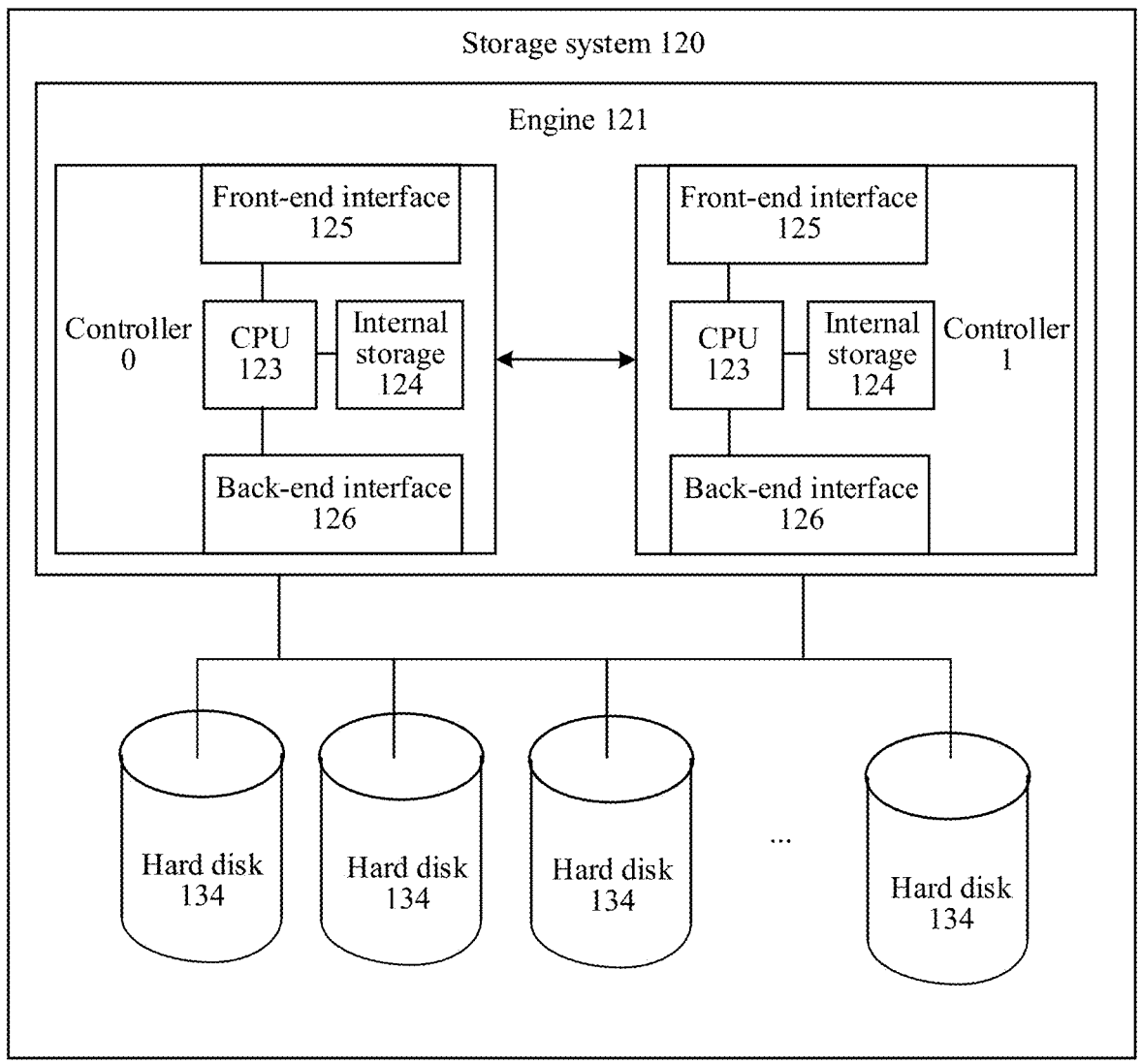
FIG. 1B is an architectural diagram of a centralized storage system 220 of a disk and controller integrated structure to which an embodiment of this application is applied.
Figure 1C:
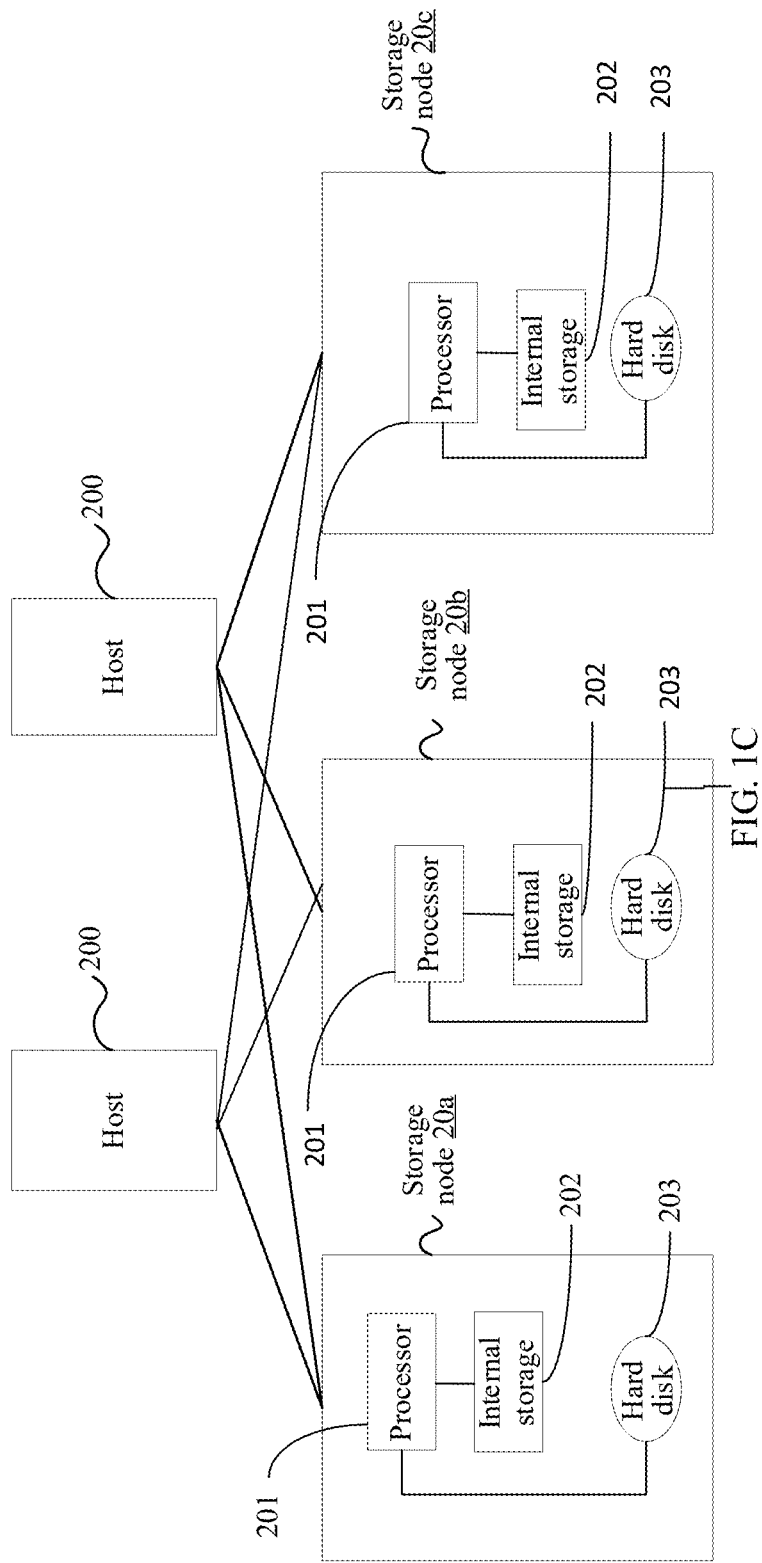
FIG. 1C is an architectural diagram of a distributed storage system to which an embodiment of this application is applied.

This embodiment of this application may alternatively be applied to a distributed storage system shown in FIG. 1C. The distributed storage system includes a storage node cluster. The storage node cluster includes one or more storage nodes 20 (FIG. 1C shows three storage nodes 20a, 20b, and 20c, but there are not limited to the three storage nodes), and the storage nodes 20 may be interconnected. Each storage node 20 is connected to a plurality of hosts 200. Each host 200 is connected to a plurality of storage nodes 20, and interacts with the plurality of storage nodes 20, to distribute and store data in the plurality of storage nodes 20, so that reliable data storage is implemented. Each storage node 20 includes at least a processor 201, a memory 202, and a hard disk 203. Structures and functions of the processor 201, the memory 202, and the hard disk 203 are the same as those of the processor 123, the memory 124, and the hard disk 134 in FIG. 1A. For details, refer to related descriptions in FIG. 1A. Details are not described herein again.

Figure 2:
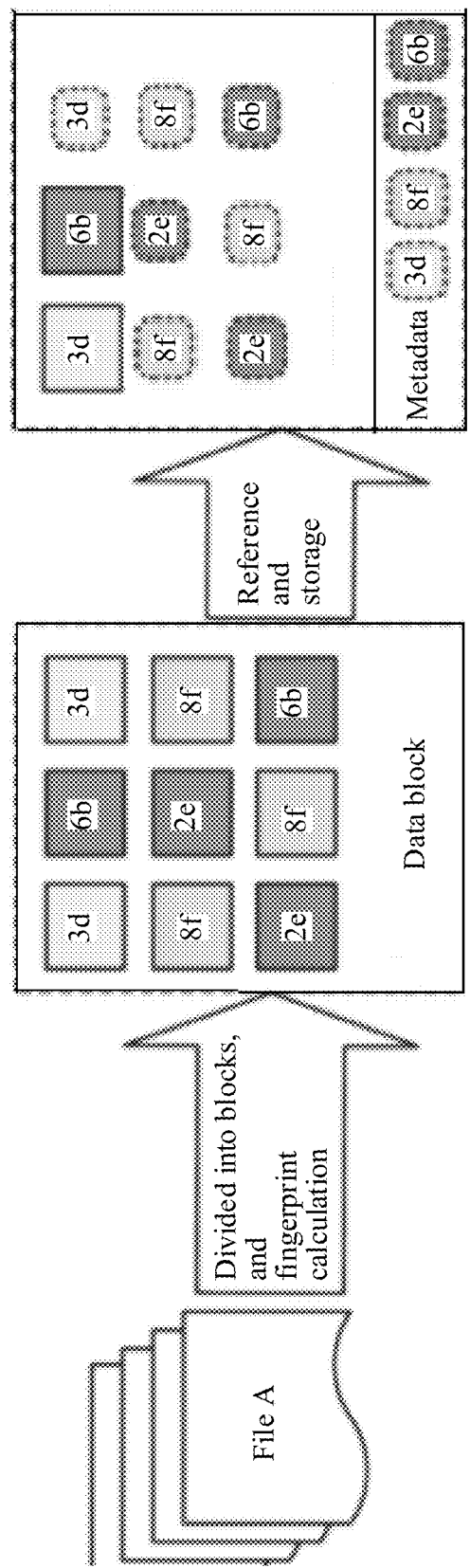
FIG. 2 is a schematic diagram of a process of performing deduplication on block granularity data.

In the storage system, duplicate data deletion (which is referred as deduplication for short) is usually used to reduce time required for storing data and save storage space. FIG. 2 is a schematic diagram of performing deduplication on block granularity data. As shown in FIG. 2, when a file (for example, a file A) is stored, the file A is first divided into a plurality of data blocks based on a predetermined size, and a fingerprint of each data block is calculated. For example, as shown in FIG. 2, the file A is divided into nine data blocks, where the fingerprint of each data block includes, for example, four fingerprints 3d, 6b, 8f, and 2e. Metadata of data in the storage system 120 records the plurality of fingerprints of the stored data blocks and a logical address of the data block corresponding to each fingerprint. The stored data block is a data block included in a file of an old version. Therefore, the storage system 120 can determine, based on the metadata, whether a fingerprint of each currently to-be-stored data block has been recorded in the metadata. If the to-be-stored data block has been recorded in the metadata, the data block does not need to be stored in a hard disk again (in other words, deduplication is performed on the data block), and it is recorded, in the storage system (for example, the metadata of the file A), that the data block in the file A refers to the data block in the file of the old version, where the reference points to the logical address of the data block in the old version. Therefore, when the file A is read, the corresponding data block may be read based on the reference and based on the logical address. If the fingerprint of the currently to-be-stored data block is not recorded in the metadata, the data block is stored in a current consecutive write address (a physical address), and the fingerprint is added to the metadata. In this way, deduplication is performed on a data block that is in a new version and that is the same as that in the old version, so that an amount of data that currently needs to be written into the hard disk (in other words, stored in the hard disk) can be reduced. Therefore, data write time is reduced, and storage space is saved.

Specifically, for the file A in FIG. 2, after the file A is divided into blocks, a data block whose fingerprint is 3d is first written based on an arrangement sequence of the data blocks. Assuming that the fingerprint 3d is not recorded in the metadata currently, the data block whose fingerprint is 3d is newly stored (newly written) in the hard disk of the storage system, and the fingerprint 3d and a logical address of the data block corresponding to the fingerprint 3d are added to the metadata. Then, a data block whose fingerprint is 6b is written into the storage system. Assuming that the fingerprint 6b is also not recorded in the metadata currently, similarly, the data block whose fingerprint is 6b is newly written into the hard disk and is recorded in the metadata. Then, when a second data block whose fingerprint is 3d is stored, because the fingerprint 3d has been recorded in the metadata, deduplication may be performed on the data block, and the previous data block whose fingerprint is 3d may be referred to. In other words, the data block does not need to be stored in the hard disk, but a reference of the data block to the previous data block whose fingerprint is 3d is recorded (which is shown by a dashed-line and round-corner box in the figure). A process of performing deduplication on a data block may also be referred to as a process of performing deduplication and writing on the data block. Then, the storage system writes a data block whose fingerprint is 8f. Assuming that the fingerprint 8f is recorded in the metadata currently, deduplication may be performed on the data block, and a data block whose fingerprint is 8f in the file of the old version may be referred to. In this way, the file A is written. As shown in FIG. 2, actually, only one data block whose fingerprint is 3d and one data block whose fingerprint is 6b need to be written into the hard disk (in other words, stored in the hard disk), and other data blocks may refer to data blocks that have been stored in the storage system, to reduce time of writing the data block into the hard disk.

The storage system 120 shown in FIG. 1A is used as an example. The host 200 may use the storage system 120 as secondary storage, to back up and store data generated in the host every day. A user of the host may process a document (for example, a document D1) in a consecutive period (for example, several consecutive days) by using the host. For example, after completing a part of the document D1 on the $1^{st}$ day, the user obtains an initial version V1 of the document D1, and stores the version V1 in the storage system 120 as a backup. After adding a part of the document D1 on the second day, the user obtains a version V2 of the document D1, and stores the version V2 in the storage system 120 as a backup. By analogy, the host may further store a version such as a version V3 of the document D1 in the storage system 120 subsequently.

Figure 3:
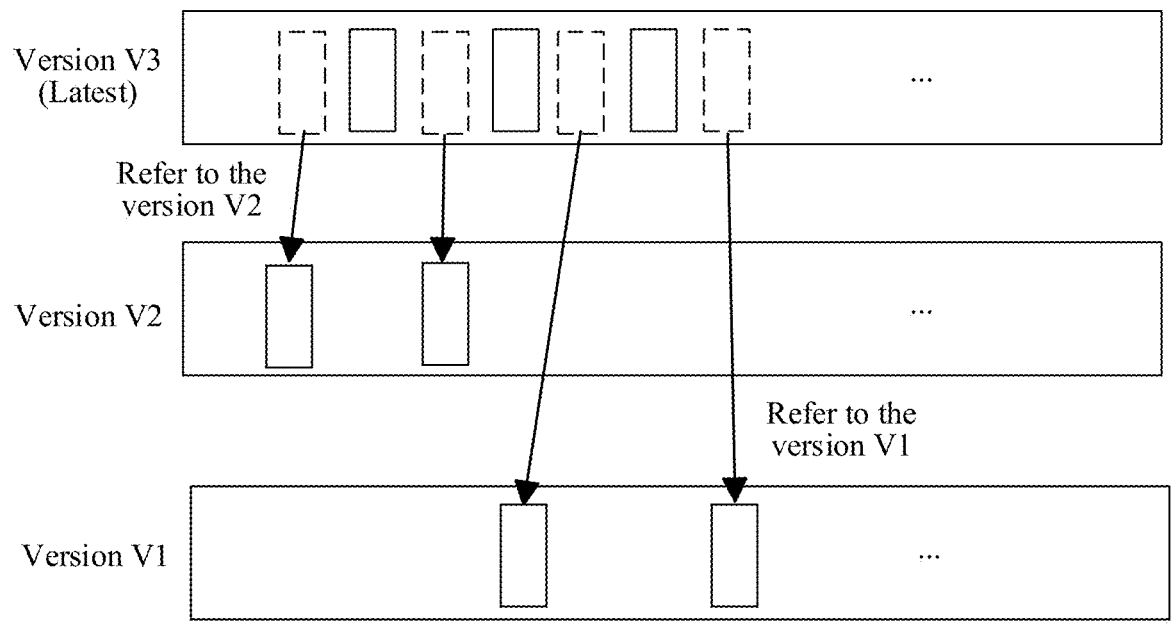
FIG. 3 is a schematic diagram of performing deduplication on data in a new version and referring to data in an old version.

When the initial version V1 is written into the storage system 120, the version V1 may be written into a consecutive physical address. When the version V2 is written, because there is a duplicated part between the version V2 and the version V1, based on the foregoing deduplication method, duplicated data in the version V2 and the version V1 does not need to be rewritten, but the data in the version V1 is referred to. Only data that is in the version V2 and that is non-duplicated in the version V1 is written. By analogy, when the version V3 is written into the storage system 120, the version V1 and the version V2 may need to be separately referred to in different parts. FIG. 3 is a schematic diagram of performing deduplication on data in a new version and referring to data in an old version. A dashed-line box represents data on which deduplication and writing is performed, a solid-line box represents data written into a hard disk, and an arrow represents a reference to data in a version.

In this case, when the version V3 needs to be read, a part of data needs to be separately read from the physical address storing the version V1, a physical address storing the version V2, and a physical address storing the version V3. In this way, especially in a case of an HDD, when the storage system reads each discrete physical address, a magnetic head needs to seek and a disk sheet needs to rotate. As a result, more time is required and a data read bandwidth is reduced. However, the version V3 is usually a version with a highest reading probability in comparison with the previous version, and in particular, requires a larger data read bandwidth.

Figure 4:
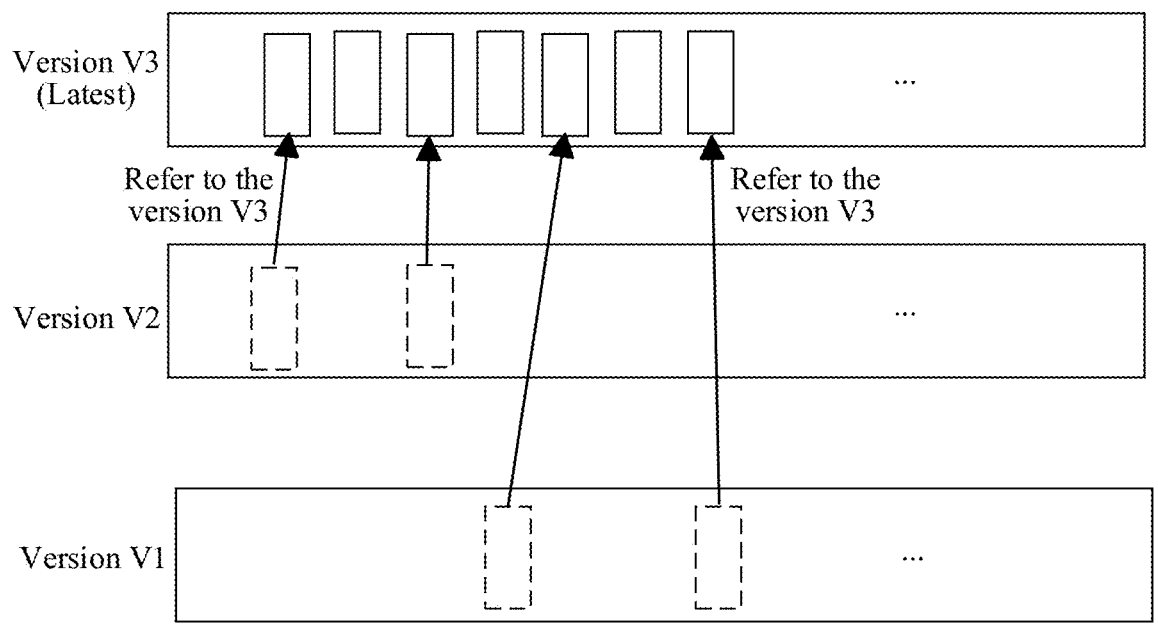
FIG. 4 is a schematic diagram of performing deduplication on data in an old version and referring to data in a new version.

Therefore, in a conventional technology, duplicated data in a new version and an old version is assigned into a plurality of containers. Each container has a fixed storage capacity. It is set that the new version can refer to at most N containers in the plurality of containers, and remaining duplicated data in the new version and the old version is rewritten. The rewriting includes: restoring the data in a hard disk, and performing deduplication on the corresponding data in the old version and referring to the data. FIG. 4 is a schematic diagram of performing deduplication on data in an old version and referring to data in a new version. Specifically, after data that needs to be rewritten is consecutively written into a new consecutive address, deduplication is performed on the data in the old version, and the newly stored data is referred to. By comparing FIG. 3 and FIG. 4, it can be learned that, by performing deduplication on the data in the old version and referring to the data in the new version, storage addresses of data in the version 3 are centralized. Therefore, in comparison with the deduplication method in FIG. 3, read performance of a latest version is improved. However, in this conventional technology, if a quantity of reference times is set to a fixed value N, only basic read performance can be ensured, and the read performance cannot be further improved based on an actual data feature. In addition, distribution of data that corresponds to different datasets and that is duplicated with that in the old version is different. In a scenario with a large data dispersion degree, an excessively large amount of data may be rewritten, and consequently, write performance of a system is affected.

In other words, in this embodiment of this specification, data is written into a storage system in a deduplication and writing manner and a manner of writing the data by storing the data in a hard disk (which is referred to as writing the data into the hard disk for short). In the deduplication and writing manner, deduplication is performed on the to-be-written data, and the data in the old version is referred to. Therefore, the data does not need to be stored in the hard disk, and only the reference to the data in the old version needs to be recorded. The manner of writing the data into the hard disk is a writing manner of storing the data in the hard disk. The writing the data into the hard disk includes new writing and rewriting. The new writing means that the written data was not stored in the hard disk in the past, and therefore, the data is first stored in the hard disk. The rewriting means that the written data has been stored in the hard disk in the past, and is restored in the hard disk to improve read performance of latest data, and deduplication is performed on the same data stored in the past, and the newly written data is referred to.

Figure 5:
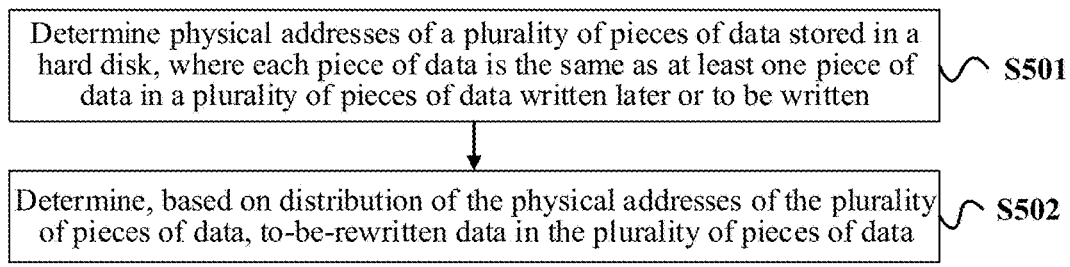
FIG. 5 is a flowchart of a data processing method according to an embodiment of this application.

FIG. 5 is a flowchart of a data processing method according to an embodiment of this application. The method is performed by a storage system, and includes the following steps.

Step S501: Determine physical addresses of a plurality of pieces of data stored in a hard disk, where each piece of the data is the same as at least one piece of data in a plurality of pieces of data written later or to be written.

Step S502: Determine, based on distribution of the physical addresses of the plurality of pieces of data, to-be-rewritten data in the plurality of pieces of data.

The method shown in FIG. 5 may be performed by the storage system in FIG. 1A, FIG. 1B, or FIG. 1C. The following uses the storage system 120 shown in FIG. 1A as an example for description. For example, the method may be performed by the controller 0 or the controller 1 in the storage system 120. The following uses the controller 0 as an example for description.

The following describes the steps shown in FIG. 5 in detail.

First, in step S501, the physical addresses of the plurality of pieces of data stored in the hard disk are determined, where each piece of the data is the same as at least one piece of data in the plurality of pieces of data written later or to be written.

In an implementation, the storage system 120 performs non-source deduplication on data that the host 200 requests to write. Specifically, the host 200 sends the file A to the storage system 120, and the storage system 120 performs deduplication on the file A. Refer to the process shown in FIG. 2. After the storage system 120 receives the file A, the CPU 123 in the controller 0 first divides the file A into the plurality of data blocks, and calculates a fingerprint of each data block. Then, the CPU 123 may determine, based on the fingerprint of each data block in the file A and the fingerprint recorded in the metadata, whether each data block is a data block that is in an old version and that has been written in the past. If a fingerprint of a data block in the file A is recorded in the metadata, the data block may be determined as a written data block. If a fingerprint of a data block in the file A is not recorded in the metadata, the data block may be determined as an unwritten data block. If a data block in the file A is determined as a written data block, a physical address of the data block may be determined by using a logical address that corresponds to a fingerprint of the data block and that is recorded in metadata. Specifically, the physical address of the data block may be determined by using a correspondence that is between each logical address and each physical address and that is recorded in the storage system. Each data block in the file A is processed by using the foregoing process, to obtain physical addresses of P data blocks that are in the old version, that are duplicated with several (for example, P) data blocks in the file A, and that are stored in the storage system 120.

In another implementation, after performing deduplication on the to-be-written file A, the host 200 sends, to the storage system 120, data obtained after deduplication, to write the data into the storage system 120. Specifically, for example, the host 200 may receive the metadata shown in FIG. 2 from the storage system 120. The host 200 divides the to-be-written file A into blocks, calculates the fingerprint of each data block, performs deduplication on the file A based on the received metadata, to obtain the data that is obtained after deduplication and that is shown on the right of FIG. 2, and sends, to the storage system 120, the data obtained after deduplication. The data obtained after deduplication includes a newly written data block and reference information of a stored data block or the newly written data block. After receiving the data obtained after deduplication, the storage system 120 stores the data obtained after deduplication, to complete writing of the file A. After the file A is written as described above, the storage system 120 may obtain, in the background, the physical addresses corresponding to the plurality of (for example, P) data blocks that are in the old version and that are referred to in the file A. Similar to the foregoing implementations, the storage system 120 may obtain, by using a logical address corresponding to a corresponding fingerprint in the metadata, physical addresses corresponding to P data blocks on which deduplication is performed. It may be understood that, although that the storage system 120 obtains the physical addresses corresponding to the P data blocks on which deduplication is performed in the file A is described above, this embodiment is not limited thereto. When performing background processing, the storage system 120 may obtain a logical address of backup data stored by a user in a latest preset time period (for example, one week). Data blocks corresponding to a part of the logical addresses refer to logical addresses of data blocks in the old version. Therefore, physical addresses corresponding to a plurality of data blocks that are in the old version and that are referred to in the backup data stored in the week may be obtained based on the logical addresses of the data blocks that are in the old version and that are referred to by the part of logical addresses, so that the corresponding data blocks in the old version may be rewritten based on the plurality of physical addresses, and read performance of the backup data of the user within the latest preset time period is improved.

In other words, the data processing solution provided in this embodiment of this application is applicable to both a non-source deduplication scenario and a source deduplication scenario. The following mainly uses the non-source deduplication scenario as an example for description.

It may be understood that, although description is performed above by using one data block as one piece of data, this embodiment of this application is not limited thereto. A minimum processing unit of data may be preset as one piece of data, for example, bytes of a predetermined quantity.

In step S502, the to-be-rewritten data in the plurality of pieces of data is determined based on the distribution of the physical addresses of the plurality of pieces of data.

In this embodiment of this application, after the physical addresses of the plurality of pieces of data (for example, the P data blocks) are obtained as described above, the distribution of the plurality of physical addresses may be determined based on the plurality of physical addresses. The following uses the P data blocks as an example for description. For example, P physical addresses of the P data blocks may be assigned into a plurality of (for example, K) address ranges by using a preset address length D, so that a length of each address range is less than or equal to the address length D. The length D may be set based on a specific scenario, for example, may be set to 1M.

Figure 6:
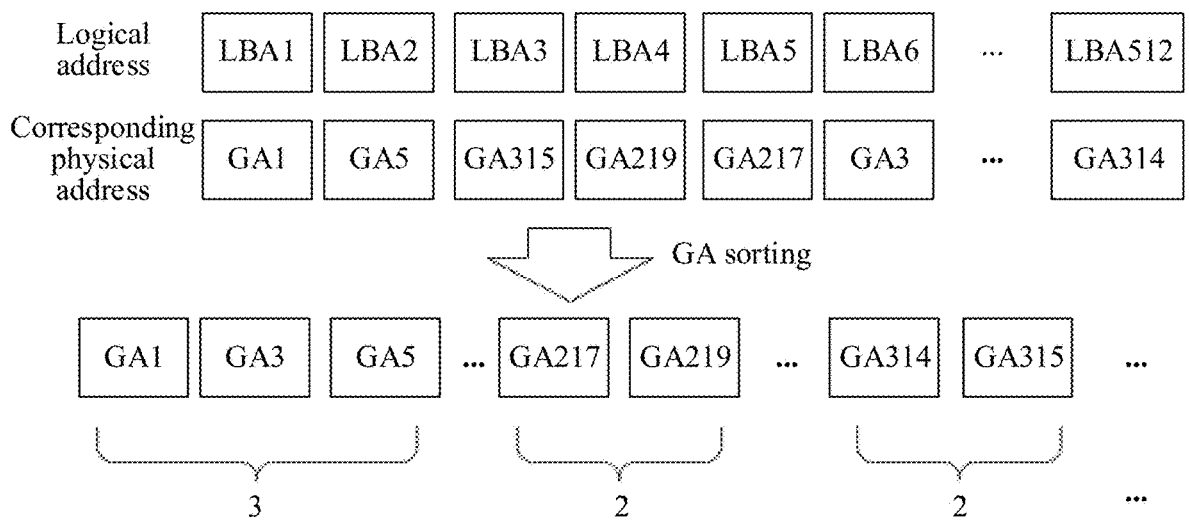
FIG. 6 is a schematic diagram of a process of assigning a plurality of physical addresses into a plurality of address ranges according to an embodiment of this application.

FIG. 6 is a schematic diagram of a process of assigning a plurality of physical addresses into a plurality of address ranges. A logical address of a data block may include a logical unit number (LUN) and a logical block address (LBA). It is assumed that logical addresses of the foregoing plurality of data blocks (in other words, the data blocks in the old version) that are the same as or duplicated with data written later or to be written are a plurality of addresses such as LBA1, LBA2, LBA3, . . . , and LBA512 (it is assumed that these data blocks have a same LUN, which is not shown in FIG. 6). As described above, the physical addresses of the data blocks in the old version, such as GA1, GA5, and GA315, may be determined based on these logical addresses. It is assumed that sizes of the physical addresses GA1, GA5, and GA315 are in proportion to sizes of sequence numbers of the physical addresses, that is, GA1<GA5<GA315, so that the plurality of physical addresses may be sorted based on the sizes of the physical addresses (for example, in ascending order). After sorting is performed, for the plurality of physical addresses sorted in ascending order in FIG. 6, for example, it may be determined that GA3 and GA5 are included in a length of 1M starting from the physical address GA1. Therefore, GA1, GA3, and GA5 are assigned into one address range, in other words, the address range includes three data blocks. It may be understood that a length of the address range is a length from a smallest address of GA1 to a largest address of GA5, and the length may be less than or equal to 1M. Similarly, GA217 and GA219 may be assigned into one address range, and GA314 and GA315 may be assigned into one address range.

Figure 7:
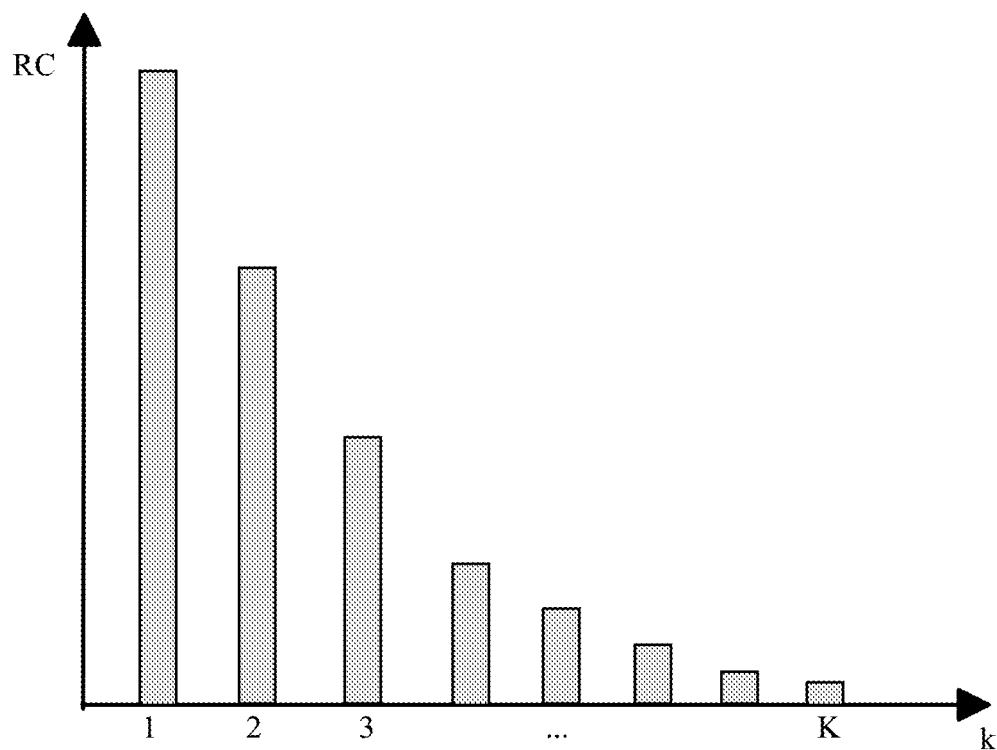
FIG. 7 is a bar chart of a quantity of data blocks in an address range and an address range sequence number according to an embodiment of this application.

In this way, after the plurality of physical addresses are assigned into, for example, K address ranges, the address ranges may be sorted in descending order of quantities of data blocks included in the address ranges, so that each address range has a corresponding sequence number. Specifically, an address range that includes a largest quantity of data blocks is represented as an address range 1, an address range that includes the second largest quantity of data blocks is represented as an address range 2, and so on. After the foregoing processing is performed, a bar chart of a quantity RC of data blocks in an address range (in other words, a quantity of data blocks included in the address range) and a sequence number k of the address range that is shown in FIG. 7 can be obtained. As shown in FIG. 7, an address range with a smaller sequence number includes more data blocks, and vice versa.

A quantity of data blocks included in each address range in FIG. 7 reflects a data dispersion degree of each address range. A larger quantity of data blocks included in an address range indicates a lower dispersion degree of the address range, and a smaller quantity of data blocks included in an address range indicates a higher dispersion degree of the address range. In this embodiment of this application, based on the quantity of data blocks included in each address range (in other words, distribution of the foregoing plurality of data blocks), an address range that needs to be rewritten in a plurality of address ranges is dynamically determined, and a data block in an address range with a high dispersion degree, a large read performance gain, and a small quantity of rewritten data blocks is rewritten, so that an optimal read performance improvement in a unit rewriting quantity is achieved.

Figure 8:
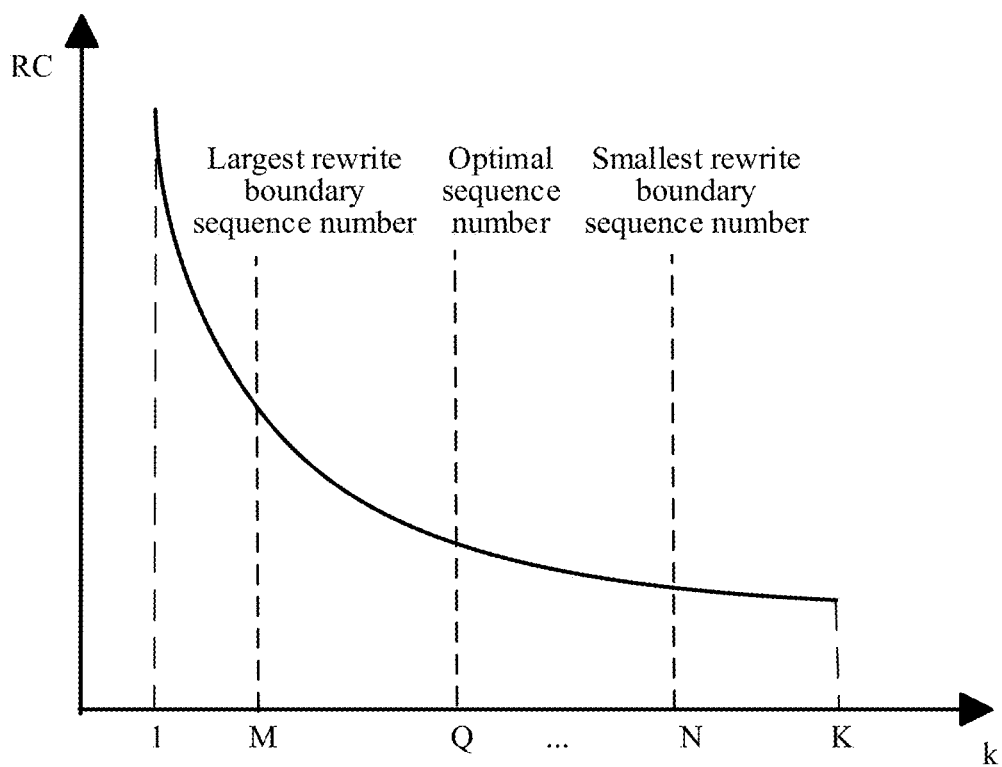
FIG. 8 is a curve chart of a quantity of data blocks in an address range and an address range sequence number according to an embodiment of this application.

Specifically, the bar chart shown in FIG. 7 may be simplified into a curve chart of a quantity of data blocks in an address range and an address range sequence number that is shown in FIG. 8. A rewrite boundary sequence number i represented by an address range sequence number i may be determined in the curve chart to improve read performance. After the rewrite boundary sequence number i is determined, a data block in an address range whose sequence number is greater than i is rewritten.

Refer to FIG. 8. When a rewrite boundary sequence number is closer to the right, a data block dispersion degree is higher and read performance is poorer when the foregoing P data blocks are read. When a target data read bandwidth is set, a rightmost sequence number threshold N of the rewrite boundary sequence number i may be determined based on the target data read bandwidth. Because a quantity of address ranges that need to be rewritten is smallest under the rightmost sequence number threshold N, the rightmost sequence number threshold N may also be referred to as a smallest rewrite boundary sequence number.

Specifically, when data is read, a data read bandwidth of the data may be calculated based on a formula (1):

$$\text{data read bandwidth} = \frac{\text{amount of to-be-read data}}{X * \left(0.005 + \frac{d}{\text{sequential read bandwidth}}\right)} \quad (1)$$

The amount of to-be-read data is a data amount of to-be-read data. The to-be-read data is, for example, the foregoing file A. The amount of to-be-read data is, for example, 4 megabytes. 0.005 is an average value of head seek time plus disk sheet rotation time of a 7200 RPM HDD. d is a preset address width (for example, an address width D of an address range, such as 1M) for one-time read (in other words, one-time I/O). The sequential read bandwidth is a speed (for example, a unit is megabyte per second) of sequentially reading a segment of consecutive addresses in a hard disk $$\frac{d}{\text{sequential read bandwidth}}$$

is duration required for reading an address range whose size is D.

$$0.005 + \frac{d}{\text{sequential read bandwidth}}$$

is total duration required for performing one-time I/O on the address range whose size is D. X is a quantity of address ranges distributed in physical storage addresses corresponding to the to-be-read data.

$$X * \left(0.005 + \frac{d}{\text{sequential read bandwidth}}\right)$$

is total duration required for reading the to-be-read data.

When a minimum value of the data read bandwidth (namely, the target read bandwidth) is preset, the following formula (2) may be obtained:

$$\frac{\text{amount of to-be-read data}}{X * \left(0.005 + \frac{d}{\text{sequential read bandwidth}}\right)} \geq \text{target read bandwidth} \quad (2)$$

The following formula (3) may be deduced based on the formula (2):

$$X \leq \frac{\text{amount of to-be-read data}}{\text{target read bandwidth} * \left(0.005 + \frac{d}{\text{sequential read bandwidth}}\right)} \quad (3)$$

In other words, to reach the target read bandwidth, there is an upper limit for X. X address ranges include i address ranges corresponding to a data block on which deduplication is performed in the to-be-read data and j address ranges corresponding to a plurality of data blocks newly written into the hard disk, where i corresponds to the rewrite boundary sequence number. The i address ranges corresponding to the data block on which deduplication is performed are a plurality of address ranges corresponding to a data block referred to by the data block on which deduplication is performed. Refer to FIG. 8. A larger value of i indicates a smaller quantity of data blocks included in a corresponding address range, in other words, a larger data dispersion degree in the corresponding address range. As a result, there are more address ranges in which the to-be-read data is actually distributed, in other words, X is larger. If the value of i is reduced by rewriting a part of data, because a dispersion degree of the rewritten data is low (that is, consecutively writing), address ranges in which the to-be-read data is actually distributed are reduced, in other words, X is reduced.

In one case, as shown in FIG. 8, if X can satisfy the formula (3) even if i=K, an upper limit of i is K, that is, N=K. In another case, if X cannot meet the formula (3) when i=K, X may be reduced by rewriting data blocks in several address ranges with a maximum dispersion degree in K address ranges, so that reduced X meets the formula (3).

Specifically, for the latter case, a formula (4) may be deduced based on the formula (3), to calculate N:

$$N = \frac{\text{amount of to-be-read data}}{\text{target read bandwidth} * \left(0.005 + \frac{d}{\text{sequential read } bandwidt}\right)} - J - \frac{\left(\sum_{k=N+1}^{K} RC_k\right) * t}{d} \quad (4)$$

J is a quantity of address ranges corresponding to a newly written data block in the file A. $RC_k$ is a quantity of data blocks included in each address range in FIG. 8.

$$\sum_{k=N+1}^{K} RC_k$$

is a total quantity of rewritten data blocks. t is a data size of a data block.

$$\frac{\left(\sum_{k=N+1}^{K} RC_k\right) * t}{d}$$

is a quantity of address ranges corresponding to the rewritten data block.

Refer to FIG. 8 again. When the rewrite boundary sequence number is closer to the left, more data blocks need to be rewritten when the file A is written, and consequently, a data write bandwidth (namely, a write speed) of the file A is lower. When a target data write bandwidth is set, a leftmost sequence number threshold M of the rewrite boundary sequence number i may be determined based on the target data write bandwidth. Because a quantity of address ranges that need to be rewritten is largest under the leftmost sequence number threshold M, the leftmost sequence number threshold M may also be referred to as a largest rewrite boundary sequence number.

Specifically, it is assumed that the file A includes Total data blocks in total, including $N_{newly\ written}$ newly written data blocks and $N_{rewritten}$ rewritten data blocks. A ratio P may be calculated based on a formula (5):

$$P = \frac{N_{newly\ written} + N_{rewritten}}{Total} \quad (5)$$

In this way, a data write bandwidth $BW_{real}$ may be calculated based on the following formula (6):

$$BW_{real} = \frac{1}{\frac{1-P}{BW_{dedup}} + \frac{P}{BW_{write}}} = \frac{BW_{dedup} * BW_{write}}{BW_{write} + (BW_{dedup} - BW_{write}) * P} \quad (6)$$

$BW_{dedup}$ is a data write bandwidth obtained by performing deduplication on all data blocks in the file A. $BW_{write}$ is a data write bandwidth obtained by writing all the data blocks in the file A into the hard disk (in other words, storing the data blocks in the hard disk).

When a minimum value of the data write bandwidth $BW_{real}$ (namely, a target write bandwidth) is preset, the following formula (7) may be obtained:

$$\frac{BW_{dedup} * BW_{write}}{BW_{write} + (BW_{dedup} - BW_{write}) * P} \geq target\ write\ bandwidth \quad (7)$$

A formula (8) may be deduced based on the formula (5) and the formula (7):

$$N_{rewritten} \leq \frac{(BW_{dedup} - target\ write\ bandwidth) * BW_{write} * Total}{(BW_{dedup} - BW_{write}) * target\ write\ bandwidth} - N_{newly\ written} \quad (8)$$

Based on the formula (8), when i is a lower limit value M, $$N_{rewritten} = Total - \sum_{k=1}^{M} RC_k - N_{newly\ written}.$$

Therefore, a formula (9) is obtained to calculate the lower limit value M of i:

$$\sum_{k=1}^{M} RC_k = Total - \frac{(BW_{dedup} - target\ write\ bandwidth) * BW_{write} * Total}{(BW_{dedup} - BW_{write}) * target\ write\ bandwidth} \quad (9)$$

When N=K and M=K are obtained through calculation as described above, data blocks in the K address ranges may not be rewritten. When M=N<K is obtained through calculation, N may be used as an optimal rewrite boundary sequence number, in other words, data blocks in a plurality of address ranges from N+1 to K are rewritten. When M<N<K is obtained through calculation, the optimal rewrite boundary sequence number may be determined between M and N.

In an implementation, an inflection point of read/write performance may be found based on a quantity of valid data blocks in each address range in FIG. 8, to determine the optimal rewrite boundary sequence number (which is referred to as an optimal sequence number for short below).

Specifically, read/write performance @ when a sequence number i of an address range i is used as the rewrite boundary sequence number may be quantized by using a formula (10):

$$\partial = \frac{Total}{(i-1)RC_i} \quad (10)$$

In other words, $1/i-1$ represents read performance. To be specific, when a value of i is larger, a value of $1/i-1$ is smaller, indicating poorer read performance. During actual data reading, when the value of i is larger, more discrete data needs to be read. As a result, a read bandwidth is lower, in other words, the read performance is poorer. $1/RC_i$ represents write performance. To be specific, when the value of i is larger, a quantity of data blocks in a corresponding address range is smaller, and a value of $1/RC_i$ is larger, indicating higher write performance. During actually data writing, when the value of i is larger, there is less rewritten data. As a result, a write bandwidth is higher, in other words, the write performance is higher.

Based on the formula (10), a plurality of $\partial$ respectively corresponding to an address range M to an address range N may be calculated, to obtain a largest $\partial$ value in the plurality of $\partial$. The largest $\partial$ value corresponds to an address range Q with optimal read/write performance. Therefore, a sequence number Q of the determined address range Q may be set as the optimal sequence number.

In another implementation, an accumulated gain and a rewriting cost of each address range in the address range M to the address range N may be calculated, to determine, as the optimal sequence number, a sequence number Q of an address range Q that obtains a largest gain at a smallest rewriting cost.

Specifically, a gain and a cost when the sequence number i of the address range i is used as the rewrite boundary sequence number may be quantized by using a formula (11):

$$\epsilon = \frac{(N-i)^2}{\sum_{i}^{N} RC_i} \quad (11)$$

$(N-i)^2$ is for fitting an accumulated gain that is of read performance and that is brought by rewriting N−i address ranges. In other words, a larger value of i indicates a smaller accumulated gain of the read performance.

$$\frac{1}{\sum_{i}^{N} RC_i}$$

is for fitting a cost that is of write performance and that is brought by rewriting the N−i address ranges. In other words, a larger value of i indicates a smaller cost of the write performance.

Based on the formula (11), the plurality of $\epsilon$ respectively corresponding to the address range M to the address range N may be calculated, to obtain a largest $\epsilon$ value in the plurality of $\epsilon$. The largest $\epsilon$ value corresponds to the address range Q with the optimal read/write performance. Therefore, the sequence number of the determined address range Q may be set as the optimal sequence number.

Based on the formula (10) and the formula (11), the optimal sequence number is only related to distribution of each data block on which deduplication is performed in data. Therefore, each time data (for example, a backup file) is stored, the optimal sequence number is dynamically generated relative to specific data distribution, to provide higher read/write performance.

After determining the optimal sequence number as described above, the storage system 120 may determine a plurality of to-be-rewritten data blocks in the P data blocks, in other words, a plurality of data blocks included in the address range Q to an address range K on the right of the optimal sequence number in FIG. 8. As shown in FIG. 4, the storage system 120 may rewrite the plurality of data blocks, rewrite the plurality of data blocks into consecutive disk space, and modify the metadata, in other words, modify logical addresses corresponding to respective fingerprints of the plurality of data blocks in the metadata to new rewritten logical addresses. In addition, the storage system 120 may delete the plurality of data blocks in an old version offline, and the plurality of data blocks in the old version refer to same data blocks in a rewritten new version, in other words, a reference relationship between the plurality of data blocks in the old version and the rewritten data block in the new version is recorded.

In a source deduplication scenario, similar to the foregoing process, a minimum rewrite boundary sequence number N in the K address ranges may be determined by using the formula (4), and a maximum rewrite boundary sequence number M may be determined by using the formula (9). In this scenario, the maximum rewrite boundary sequence number M is determined by using the formula (9), so that an amount of rewritten data can be limited within a target range. In addition, the storage system 120 may determine the optimal sequence number Q based on the formula (10) or the formula (11) similar to the foregoing. After determining the plurality of to-be-rewritten data blocks in the P data blocks, the storage system 120 rewrites the plurality of data blocks and modifies the metadata similarly as shown in FIG. 4. In addition, the storage system 120 may delete the plurality of data blocks in the old version offline, and the plurality of data blocks on which deduplication is performed in the old version refer to the rewritten data blocks.

In the foregoing data processing solution, a low dispersion degree of data in a physical storage space may be ensured. However, to achieve complete sequential data, more data migration and sorting are required, and a high cost is introduced. In this embodiment of this application, a method for reading discrete data is provided based on data distribution obtained after the foregoing data processing, to dynamically determine whether to aggregate discrete data for reading, to reduce seek time on an HDD, so as to further improve read performance.

Figure 9:
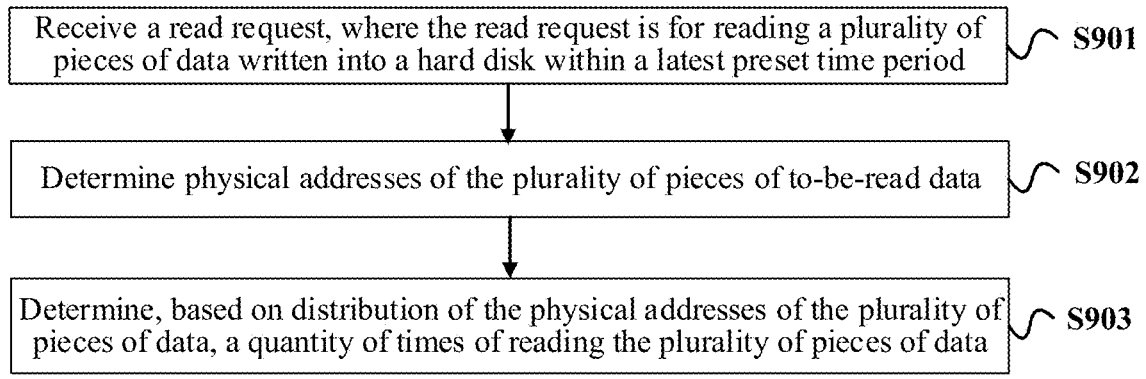
FIG. 9 is a flowchart of a data reading method according to an embodiment of this application.

FIG. 9 is a flowchart of a data reading method according to an embodiment of this application. The method includes the following steps.

Step S901: Receive a read request, where the read request is for reading a plurality of pieces of data written into a hard disk within a latest preset time period, and the plurality of pieces of data include data written within the latest preset time period by using the method shown in FIG. 5.

Step S902: Determine physical addresses of the plurality of pieces of to-be-read data.

Step S903: Determine, based on distribution of the physical addresses of the plurality of pieces of data, a quantity of times of reading the plurality of pieces of data. First, in step S901, the read request is received. The read request is for reading the plurality of pieces of data written into the hard disk within the latest preset time period. The plurality of pieces of data include the data written within the latest preset time period by using the method shown in FIG. 5.

A host 200 may request, from a storage system, to read one or more versions of a document written within the latest preset time period, where the one or more versions include a plurality of data blocks. As described above, by using the method shown in FIG. 5, when the host requests to write the plurality of data blocks, the plurality of data blocks may be written into the storage system in three manners: a part of the data blocks are not written into the storage system before this writing, and the part of the data blocks are stored in the hard disk in a new writing manner; a part of the data blocks have been written into the storage system before this writing, and deduplication is performed on the part of the data blocks, and data blocks that are the same as those in a previous version are referred to; and a part of the data blocks have been written into the storage system before this writing, and are rewritten (in other words, restored) into the hard disk by using the method shown in FIG. 5, and deduplication is performed on the data blocks that are the same as those in the previous version, and the rewritten data blocks are referred to.

Therefore, the plurality of pieces of data written into the hard disk within the latest preset time period are processed by using the method shown in FIG. 5, so that the plurality of pieces of data are stored in the hard disk at a low dispersion degree. Therefore, the following steps may be performed to combine and read at least a part of data in the plurality of pieces of data.

For step S902, refer to the foregoing descriptions of step S501, and details are not described herein again.

In step S903, similar to the foregoing descriptions, the plurality of pieces of data may be assigned into a plurality of address ranges (it is assumed that K address ranges are obtained) based on a preset address range length L, so that a length of each address range is less than or equal to the address length L. The preset length L may be the same as or different from the foregoing preset length D. Specifically, the K address ranges may be sorted in ascending order of addresses. For the K address ranges that are sorted in sequence, the storage system 120 may determine whether an address length between a largest address and a smallest address in n address ranges that are consecutively sorted is less than or equal to n*L. If yes, the n address ranges may be read for one time.

Specifically, for an address range G1 and an address range G2 that are consecutively sorted, it is assumed that an address of the address range G1 is smaller than an address of the address range G2, a largest address of the address range G2 is $GA2_{max}$, and a smallest address of the address range G1 is $GA1_{min}$. If $GA2_{max} - GA1_{min} \leq 2L$, the two address ranges are combined for reading, in other words, data from $GA1_{min}$ to $GA2_{max}$ is consecutively read through one-time reading operation, to read the address range G1 and the address range G2.

Figure 10:
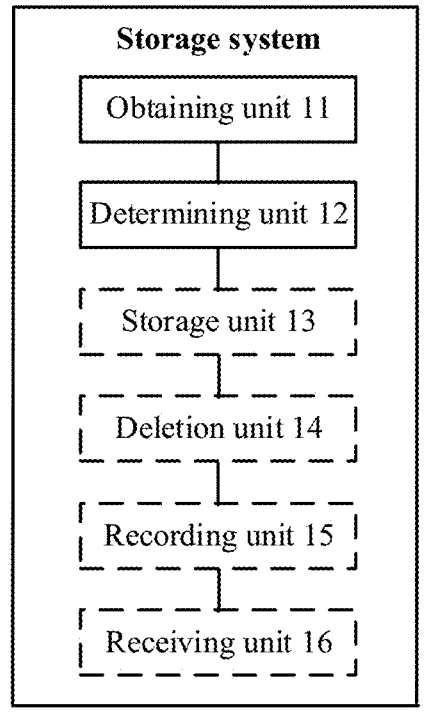
FIG. 10 is an architectural diagram of a storage system according to an embodiment of this application.

FIG. 10 is an architectural diagram of a storage system according to an embodiment of this application. The storage system is configured to perform the method shown in FIG. 5 or FIG. 9. The storage system includes:

an obtaining unit 11, configured to obtain physical addresses of a plurality of pieces of first data stored in a hard disk, where each piece of first data is the same as at least one piece of second data in a plurality of pieces of second data written later or to be written; and a determining unit 12, configured to determine, based on distribution of the physical addresses of the plurality of pieces of first data, to-be-rewritten target first data in the plurality of pieces of first data.

In a possible implementation, the plurality of pieces of second data are data written in a latest preset time period, and the plurality of pieces of second data refer to the plurality of pieces of first data.

In a possible implementation, the determining unit 12 is specifically configured to: assign, based on the physical addresses of the plurality of pieces of first data, the plurality of pieces of first data into a plurality of address ranges, where a length of each address range is less than or equal to a first preset length; and determine, based on an amount of first data included in each address range, a quantity of target address ranges in the plurality of address ranges, where first data in the target address range is the target first data.

In a possible implementation, the determining unit 12 is specifically configured to: sort the plurality of physical addresses based on sizes of the physical addresses of the plurality of pieces of first data; and assign at least one consecutively sorted first physical address in the plurality of physical addresses into one target address range, where a difference between a largest address and a smallest address in the at least one first physical address is less than or equal to the first preset length.

In a possible implementation, the determining unit 12 is specifically configured to: sort the plurality of address ranges in descending order of amount of first data included in each address range; and determine, based on a sorting position of each address range and the amount of first data included in each address range, the quantity of target address ranges in the plurality of address ranges.

In a possible implementation, the determining unit 12 is specifically configured to: determine a first sequence number based on a sorting sequence number of the sorting position of each address range, the amount of first data included in each address range, a total amount of to-be-written data, a target write bandwidth, a first write bandwidth, and a second write bandwidth, where the first sequence number indicates a largest quantity of target address ranges; and determine, based on the first sequence number, the quantity of target address ranges, where the first write bandwidth is a write bandwidth corresponding to performing deduplication on all the second data, and the second write bandwidth is a write bandwidth corresponding to storing all the second data in the hard disk.

In a possible implementation, the determining unit 12 is specifically configured to: determine a second sequence number based on the sorting sequence number of the sorting position of each address range, the amount of first data included in each address range, a data amount of target data, a target read bandwidth, and an amount of data that is first written and that is in the target data, where the second sequence number indicates a smallest quantity of target address ranges; and determine, based on the second sequence number, the quantity of target address ranges.

In a possible implementation, the determining unit 12 is specifically configured to: determine, based on the sorting sequence number of the sorting position of each address range and the amount of first data included in each address range, an optimal sequence number between the first sequence number and the second sequence number; and determine, based on the optimal sequence number, the quantity of target address ranges in the plurality of address ranges.

In a possible implementation, the storage system further includes: a storage unit 13, configured to store, in the hard disk, target second data that is the same as the target first data; a deletion unit 14, configured to delete the target first data from the hard disk; and a recording unit 15, configured to record a reference of the target first data to the target second data.

In a possible implementation, the storage system further includes: a receiving unit 16, configured to receive a read request, where the read request is for reading a plurality of pieces of third data written into the hard disk within the latest preset time period, and the plurality of pieces of third data include the plurality of pieces of second data; the obtaining unit 11 is further configured to obtain physical addresses of the plurality of pieces of third data; and the determining unit 12 is further configured to determine, based on distribution of the physical addresses of the plurality of pieces of third data, a quantity of times of reading the plurality of pieces of third data.

In a possible implementation, the determining unit 12 is specifically configured to: assign, based on the physical addresses of the plurality of pieces of third data, the plurality of pieces of third data into a plurality of address ranges, where a length of each address range is less than or equal to a second preset length; and determine to read n first address ranges in the plurality of address ranges for one time, where a difference between a largest address and a smallest address in the n first address ranges is less than or equal to n times of the second preset length.

An embodiment of this application further provides a storage system, including a processor and a memory. The memory stores executable computer program instructions, and the processor executes the executable computer program instructions to implement the method shown in FIG. 5 or FIG. 9.

An embodiment of this application further provides a computer-readable storage medium. The computer-readable storage medium stores computer program instructions. When the computer program instructions are executed in a computer or a processor, the computer or the processor is enabled to perform the method shown in FIG. 5 or FIG. 9.

An embodiment of this application further provides a computer program product, including computer program instructions. When the computer program instructions are run on a computer or a processor, the computer or the processor is enabled to perform the method shown in FIG. 5 or FIG. 9.

It should be understood that terms such as "first" and "second" in this specification is used to achieve simplicity in distinguishing similar concepts, and do not constitute any limitation.

A person skilled in the art may clearly understand that, descriptions of embodiments provided in this application may be mutually referred to. For ease and brevity of description, for example, for functions of the apparatuses and devices and performed steps that are provided in embodiments of this application, refer to related descriptions in method embodiments of this application. Reference can also be made between various method embodiments and between various apparatus embodiments.

A person skilled in the art may understand that all or a part of the steps of the foregoing method embodiments may be implemented by a program instructing related hardware. The foregoing program may be stored in a computer-readable storage medium. When the program is executed, all or a part of the steps of the foregoing method embodiments are performed. The foregoing storage medium includes any medium that can store program code, such as a read-only memory (ROM), a random access memory (RAM), a magnetic disk, or an optical disc.

All or a part of the foregoing embodiments may be implemented by using software, hardware, firmware, or any combination thereof. When software is used to implement the embodiments, all or a part of embodiments may be implemented in a form of a computer program product. The computer program product includes one or more computer instructions. When the computer program instructions are loaded and executed on a computer, the procedure or functions according to embodiments of the present invention are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium, or a semiconductor medium (for example, a solid-state drive (SSD)), or the like.

In the several embodiments provided in this application, it should be understood that the disclosed apparatus and method may be implemented in other manners. For example, the described embodiments are merely examples. For example, division into the modules or units is merely logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. A part or all of the modules may be selected according to actual needs to achieve the objectives of the solutions of embodiments. A person of ordinary skill in the art may understand and implement embodiments of the present invention without creative efforts.

In addition, the apparatus and method described herein, and schematic diagrams of different embodiments can be combined or integrated with other systems, modules, technologies, or methods without departing from the scope of this application. In addition, the displayed or discussed mutual couplings or direct couplings or communication connections may be implemented by using some interfaces. The indirect couplings or communication connections between the apparatuses or units may be implemented in electronic, mechanical, or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data processing method, wherein the method is performed by a storage system, and comprises:
    obtaining physical addresses of a plurality of pieces of first data stored in a hard disk, wherein each piece of first data is the same as at least one piece of second data in a plurality of pieces of second data written later or to be written; and
    determining, based on distribution of the physical addresses of the plurality of pieces of first data, to-be-rewritten target first data in the plurality of pieces of first data, wherein the determining comprises:
        assigning, based on the physical addresses of the plurality of pieces of first data, the plurality of pieces of first data into a plurality of address ranges, wherein a length of each address range is less than or equal to a first preset length; and
        determining, based on an amount of first data comprised in each address range, a quantity of one or more target address ranges in the plurality of address ranges, wherein first data in the one or more target address ranges is the to-be-rewritten target first data.

2. The method according to claim 1, wherein the plurality of pieces of second data are data written in a latest preset time period, and the plurality of pieces of second data refer to the plurality of pieces of first data.

3. The method according to claim 1, wherein the assigning, based on the physical addresses of the plurality of pieces of first data, the plurality of pieces of first data into a plurality of address ranges comprises:
    sorting the physical addresses based on sizes of the physical addresses of the plurality of pieces of first data; and
    assigning at least one consecutively sorted first physical address in the physical addresses into one target address range, wherein a difference between a largest address and a smallest address in the at least one consecutively sorted first physical address is less than or equal to the first preset length.

4. The method according to claim 1, wherein the determining, based on an amount of first data comprised in each address range, a quantity of one or more target address ranges in the plurality of address ranges comprises:
    sorting the plurality of address ranges in descending order of the amount of first data comprised in each address range; and
    determining, based on a sorting position of each address range and the amount of first data comprised in each address range, the quantity of one or more target address ranges in the plurality of address ranges.

5. The method according to claim 4, wherein the determining, based on a sorting position of each address range and the amount of first data comprised in each address range, the quantity of one or more target address ranges in the plurality of address ranges comprises:
    determining a first sequence number based on a sorting sequence number of the sorting position of each address range, the amount of first data comprised in each address range, a total amount of to-be-written data, a target write bandwidth, a first write bandwidth, and a second write bandwidth, wherein the first sequence number indicates a largest quantity of one or more target address ranges; and determining, based on the first sequence number, the quantity of one or more target address ranges, wherein the first write bandwidth is a write bandwidth corresponding to performing deduplication on all the second data, and the second write bandwidth is a write bandwidth corresponding to storing all the second data in the hard disk.

6. The method according to claim 5, wherein the determining, based on a sorting position of each address range and the amount of first data comprised in each address range, the quantity of one or more target address ranges in the plurality of address ranges comprises:
determining a second sequence number based on the sorting sequence number of the sorting position of each address range, the amount of first data comprised in each address range, a data amount of target data, a target read bandwidth, and an amount of data that is first written and that is in the target data, wherein the second sequence number indicates a smallest quantity of one or more target address ranges; and
determining, based on the second sequence number, the quantity of one or more target address ranges.

7. The method according to claim 6, wherein the determining, based on a sorting position of each address range and the amount of first data comprised in each address range, the quantity of one or more target address ranges in the plurality of address ranges comprises:
determining, based on the sorting sequence number of the sorting position of each address range and the amount of first data comprised in each address range, an optimal sequence number between the first sequence number and the second sequence number; and
determining, based on the optimal sequence number, the quantity of one or more target address ranges in the plurality of address ranges.

8. The method according to claim 1, wherein the method further comprises:
storing, in the hard disk, target second data that is the same as the to-be-rewritten target first data;
deleting the to-be-rewritten target first data from the hard disk; and
recording a reference of the to-be-rewritten target first data to the target second data.

9. The method according to claim 8, wherein the method comprises:
receiving a read request, wherein the read request is for reading a plurality of pieces of third data written into the hard disk within the latest preset time period, and the plurality of pieces of third data comprise the plurality of pieces of second data;
obtaining physical addresses of the plurality of pieces of third data; and
determining, based on distribution of the physical addresses of the plurality of pieces of third data, a quantity of times of reading the plurality of pieces of third data.

10. The method according to claim 9, wherein the determining, based on distribution of the physical addresses of the plurality of pieces of third data, a quantity of times of reading the plurality of pieces of third data comprises:
assigning, based on the physical addresses of the plurality of pieces of third data, the plurality of pieces of third data into a plurality of address ranges, wherein a second length of each address range is less than or equal to a second preset length; and
determining to read a number n of first address ranges in the plurality of address ranges for one time, wherein a difference between a largest address and a smallest address in the number n of first address ranges is less than or equal to n times of the second preset length.

11. A storage system, comprising:
at least one processor; and
one or more memories coupled to the at least one processor and storing programming instructions for execution by the at least one processor to perform operations comprising:
obtaining physical addresses of a plurality of pieces of first data stored in a hard disk, wherein each piece of first data is the same as at least one piece of second data in a plurality of pieces of second data written later or to be written; and
determining, based on distribution of the physical addresses of the plurality of pieces of first data, to-be-rewritten target first data in the plurality of pieces of first data, wherein the determining comprises:
assigning, based on the physical addresses of the plurality of pieces of first data. the plurality of pieces of first data into a plurality of address ranges, wherein a length of each address range is less than or equal to a first preset length; and
determining, based on an amount of first data comprised in each address range, a quantity of one or more target address ranges in the plurality of address ranges, wherein first data in the one or more target address ranges is the to-be-rewritten target first data.

12. The storage system according to claim 11, wherein the plurality of pieces of second data are data written in a latest preset time period, and the plurality of pieces of second data refer to the plurality of pieces of first data.

13. The storage system according to claim 11, wherein the assigning, based on the physical addresses of the pieces of first data, the plurality of pieces of first data into a plurality of address ranges comprises:
sorting the plurality of physical addresses based on sizes of the physical addresses of the plurality of pieces of first data; and
assigning at least one consecutively sorted first physical address in the physical addresses into one target address range, wherein a difference between a largest address and a smallest address in the at least one consecutively sorted first physical address is less than or equal to the first preset length.

14. The storage system according to claim 11, wherein the determining, based on an amount of first data comprised in each address range, a quantity of one or more target address ranges in the plurality of address ranges comprises:
sorting the plurality of address ranges in descending order of the amount of first data comprised in each address range; and
determining, based on a sorting position of each address range and the amount of first data comprised in each address range, the quantity of one or more target address ranges in the plurality of address ranges.

15. The storage system according to claim 14, wherein the determining, based on a sorting position of each address range and the amount of first data comprised in each address range, the quantity of one or more target address ranges in the plurality of address ranges comprises:
determining a first sequence number based on a sorting sequence number of the sorting position of each address range, the amount of first data comprised in each address range, a total amount of to-be-written data, a target write bandwidth, a first write bandwidth, and a second write bandwidth, wherein the first sequence number indicates a largest quantity of one or more target address ranges; and determining, based on the first sequence number, the quantity of one or more target address ranges, wherein the first write bandwidth is a write bandwidth corresponding to performing deduplication on all the second data, and the second write bandwidth is a write bandwidth corresponding to storing all the second data in the hard disk.

16. The storage system according to claim 15, wherein the determining, based on a sorting position of each address range and the amount of first data comprised in each address range, the quantity of one or more target address ranges in the plurality of address ranges comprises:

determining a second sequence number based on the sorting sequence number of the sorting position of each address range, the amount of first data comprised in each address range, a data amount of target data, a target read bandwidth, and an amount of data that is first written and that is in the target data, wherein the second sequence number indicates a smallest quantity of one or more target address ranges; and determining, based on the second sequence number, the quantity of one or more target address ranges.

17. The storage system according to claim 16, wherein the determining, based on a sorting position of each address range and the amount of first data comprised in each address range, the quantity of one or more target address ranges in the plurality of address ranges comprises:

determining, based on the sorting sequence number of the sorting position of each address range and the amount of first data comprised in each address range, an optimal sequence number between the first sequence number and the second sequence number; and determining, based on the optimal sequence number, the quantity of one or more target address ranges in the plurality of address ranges.

18. The storage system according to claim 11, wherein the operations further comprise:

storing, in the hard disk, target second data that is the same as the to-be-rewritten target first data;

deleting the to-be-rewritten target first data from the hard disk; and recording a reference of the to-be-rewritten target first data to the target second data.

19. A non-transitory computer-readable storage medium storing one or more programming instructions executable by at least one processor to cause the at least one processor to perform following operations:

obtaining physical addresses of a plurality of pieces of first data stored in a hard disk, wherein each piece of first data is the same as at least one piece of second data in a plurality of pieces of second data written later or to be written; and determining, based on distribution of the physical addresses of the plurality of pieces of first data, to-be-rewritten target first data in the plurality of pieces of first data, wherein the determining comprises:

assigning, based on the physical addresses of the plurality of pieces of first data, the plurality of pieces of first data into a plurality of address ranges, wherein a length of each address range is less than or equal to a first preset length; and determining, based on an amount of first data comprised in each address range, a quantity of one or more target address ranges in the plurality of address ranges, wherein first data in the one or more target address ranges is the to-be-rewritten target first data.

20. The non-transitory computer-readable storage medium according to claim 19, wherein the plurality of pieces of second data are data written in a latest preset time period, and the plurality of pieces of second data refer to the plurality of pieces of first data.

* * * * *